US009632236B2

(12) United States Patent
Chou et al.

(10) Patent No.: US 9,632,236 B2
(45) Date of Patent: Apr. 25, 2017

(54) BACKLIGHT MODULE AND DISPLAY DEVICE USING THE SAME

(71) Applicant: InnoLux Corporation, Miao-Li County (TW)

(72) Inventors: Mei-Fan Chou, Miao-Li County (TW); Tun-Chuan Chen, Miao-Li County (TW); Chun-Wei Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/335,168

(22) Filed: Oct. 26, 2016

(65) Prior Publication Data

US 2017/0045680 A1 Feb. 16, 2017

Related U.S. Application Data

(63) Continuation of application No. 14/456,175, filed on Aug. 11, 2014, now Pat. No. 9,513,425.

(30) Foreign Application Priority Data

Sep. 6, 2013 (TW) .............................. 102132146 A

(51) Int. Cl.
*F21V 8/00* (2006.01)
*F21V 5/00* (2015.01)
*G02F 1/1335* (2006.01)

(52) U.S. Cl.
CPC ........... *G02B 6/0088* (2013.01); *G02B 6/005* (2013.01); *G02B 6/0055* (2013.01);
(Continued)

(58) Field of Classification Search
CPC .............................. G02B 6/0051; F21V 5/008
(Continued)

(56) References Cited

U.S. PATENT DOCUMENTS 6,502,945 B2 1/2003 Kim et al.
8,622,600 B2 1/2014 Cheng et al.
(Continued)

FOREIGN PATENT DOCUMENTS

CN 201066421 5/2008
CN 101975371 2/2011
(Continued)

OTHER PUBLICATIONS

Chinese language office action dated Apr. 5, 2016, issued in application No. CN 201310403657.8.
(Continued)

*Primary Examiner* — Joseph L Williams
(74) *Attorney, Agent, or Firm* — McClure, Qualey & Rodack, LLP

(57) ABSTRACT

The invention provides a backlight module including: a light guiding plate having a first side surface and a second side surface; a plurality of light sources arranged along the second side surface of the light guiding plate; a quantum dot enhancement film (QDEF) disposed above the light guiding plate, wherein the QDEF includes a first edge adjacent to the first side surface and a second edge adjacent to the second side surface; and a frame disposed outside the light guiding plate, the frame having a first extension portion covering the first edge of the QDEF and a second extension portion covering the second edge of the QDEF, wherein a distance between an end of the first extending portion and the first edge of the QDEF is greater than a distance between an end of the second extension portion and the second edge of the QDEF.

15 Claims, 4 Drawing Sheets

(52) U.S. Cl.
CPC ......... *G02B 6/0056* (2013.01); *G02B 6/0068* (2013.01); *G02B 6/0073* (2013.01); *G02F 1/133528* (2013.01); *G02F 2001/133614* (2013.01)

(58) Field of Classification Search
USPC .................................................. 362/613, 97.1
See application file for complete search history.

(56) References Cited

U.S. PATENT DOCUMENTS

| | | |
|---|---|---|
| 2008/0018823 A1 | 1/2008 | Wang |
| 2011/0309325 A1 | 12/2011 | Park et al. |
| 2013/0286327 A1 | 10/2013 | Huang |
| 2014/0332829 A1 | 11/2014 | Fan |

FOREIGN PATENT DOCUMENTS

| | | |
|---|---|---|
| CN | 102297369 | 12/2011 |
| CN | 202521397 | 11/2012 |
| CN | 203069818 | 7/2013 |
| TW | M350728 | 2/2009 |

OTHER PUBLICATIONS

Chinese language office action dated Mar. 30, 2015, issued in application No. TW 102132146.

BACKLIGHT MODULE AND DISPLAY DEVICE USING THE SAME

CROSS REFERENCE TO RELATED APPLICATIONS

This application is a Continuation of pending U.S. patent application Ser. No. 14/456,175, filed Aug. 11, 2014 and entitled "Backlight Module and Display Device using the same" which claims priority of Taiwan Patent Application No. 102132146, filed on Sep. 6, 2013, the entirety of which is incorporated by reference herein.

BACKGROUND OF THE INVENTION

Field of the Invention

The present invention relates to a backlight module and a display device, and in particular to a backlight module and a display device capable of preventing blue light leaks from the edge of the display.

Description of the Related Art

To raise the color saturation of a liquid crystal display for better image quality, a manufacturer in this field has proposed an approach which applies a film called Quantum Dot Enhancement Film (QDEF) to a backlight module consisting of blue LEDs. Quantum dot enhancement film has a plurality of quantum dot phosphors of different sizes to convert the incident blue light to light having different wavelengths. Thereby, the spectrum of white light mixed from the light having different wavelengths is wider such that the color saturation of the display is higher.

In the backlight module, four edges of the quantum dot enhancement film formed on the surface of a light guiding plate should keep a predetermined distance away from the frame surrounding the light guiding plate to prevent compressive deformation due to thermal expansion. However, a portion of blue light is emitted from the gap without passing through the quantum dot enhancement film such that the user could become conscious of blue light leaks from the four edges of the display.

In view of this problem, the invention provides a backlight module and a display device reducing blue light leaks from the edges of the display for a better visual experience.

BRIEF SUMMARY OF THE INVENTION

A detailed description is given in the following embodiments with reference to the accompanying drawings.

The invention provides a backlight module, including: a light guiding plate having a first side surface and a second side surface; a plurality of light sources arranged along the second side surface of the light guiding plate; an optical film disposed above the light guiding plate; a quantum dot enhancement film disposed between the light guiding plate and the optical film, wherein the quantum dot enhancement film comprises a first edge and a second edge, the first edge is adjacent to the first side surface of the light guiding plate, and the second edge is adjacent to the second side surface of the light guiding plate; and a frame disposed outside the light guiding plate, the frame having a first extension portion and a second extension portion, wherein the first extension portion covers the first edge of the quantum dot enhancement film, and the second extension portion covers the second edge of the quantum dot enhancement film, wherein a distance between an end of the first extending portion and the first edge of the quantum dot enhancement film is a first distance, a distance between an end of the second extension portion and the second edge of the quantum dot enhancement film is a second distance, and the second distance is greater than the first distance.

In the above backlight module, the frame has a white surface faced to the quantum dot enhancement film or the light guiding plate. The at least one of the plurality of light sources is a blue LED. The optical film is a diffusion film or a brightness enhancement film.

The above backlight module further includes: a printed circuit board disposed adjacent to the light guiding plate, the light guiding plate disposed between the printed circuit board and the quantum dot enhancement film.

The above backlight module further includes: a reflection film having a third edge and a fourth edge, wherein the third edge is adjacent to the first side surface of the light guiding plate, and the fourth edge is adjacent to the second side surface of the light guiding plate, wherein the light guiding plate is disposed between the quantum dot enhancement film and the reflection film, the first edge of the quantum dot enhancement film and the second edge of the quantum dot enhancement film are opposite to each other, the third edge of the reflection film and the fourth edge of the reflection film are opposite to each other, a distance between the first edge and the second edge is a third distance, a distance between the third edge and the fourth edge is a fourth distance, and the third distance is greater than the fourth distance.

The invention also provides a display device, including: a display panel; and a backlight module disposed adjacent to the display panel, the backlight module including: a light guiding plate having a first side surface and a second side surface; a plurality of light sources arranged along the second side surface of the light guiding plate; an optical film disposed above the light guiding plate; a quantum dot enhancement film disposed between the light guiding plate and the optical film, wherein the quantum dot enhancement film comprises a first edge and a second edge, the first edge is adjacent to the first side surface of the light guiding plate, and the second edge is adjacent to the second side surface of the light guiding plate; and a frame disposed outside the light guiding plate, the frame having a first extension portion and a second extension portion, wherein the first extension portion covers the first edge of the quantum dot enhancement film, and the second extension portion covers the second edge of the quantum dot enhancement film, wherein a distance between an end of the first extending portion and the first edge of the quantum dot enhancement film is a first distance, a distance between the end of the second extension portion and the second edge of the quantum dot enhancement film is a second distance, and the second distance is greater than the first distance.

In the above display device, the frame has a white surface faced to the quantum dot enhancement film or the light guiding plate. At least one of the plurality of light sources is a blue LED. The optical film is a diffusion film or a brightness enhancement film. The backlight module further includes: a printed circuit board located adjacent to the light guiding plate, the light guiding plate disposed between the printed circuit board and the quantum dot enhancement film.

The above display device further includes: a reflection film having a third edge and a fourth edge, wherein the third edge is adjacent to the first side surface of the light guiding plate, and the fourth edge is adjacent to the second side surface of the light guiding plate, wherein the light guiding plate is disposed between the quantum dot enhancement film and the reflection film, the first edge of the quantum dot enhancement film and the second edge of the quantum dot enhancement film are opposite to each other, the third edge of the reflection film and the fourth edge of the reflection film are opposite to each other, a distance between the first edge and the second edge is a third distance, a distance between the third edge and the fourth edge is a fourth distance, and the third distance is greater than the fourth distance.

In the above display device, the display panel further includes: a first substrate and a first polarizer, wherein the first substrate is disposed between the first polarizer and the quantum dot enhancement film of the backlight module, a thickness of the first polarizer is a first thickness, a thickness of the quantum dot enhancement film is a second thickness, and the second thickness is greater than the first thickness. The display panel further includes: a second substrate and a second polarizer, wherein the second substrate is disposed between the first substrate and the quantum dot enhancement film of the backlight module, the second polarizer is disposed between the second substrate and the quantum dot enhancement film of the backlight module, a thickness of the second polarizer is a third thickness, and the second thickness is greater than the third thickness. In the above display device, the first polarizer has a fifth edge and a sixth edge, the fifth edge is adjacent to the first side surface of the light guiding plate, and the sixth edge is adjacent to the second side surface of the light guiding plate, the first polarizer covers the end of the first extension portion, the first polarizer covers the end of the second extension portion, a distance between the end of the first extending portion and the fifth edge of the first polarizer is a fourth distance, a distance between the end of the second extension portion and the sixth edge of the first polarizer is a fifth distance, and the fifth distance is greater than the fourth distance.

According to the above backlight module and display device, blue light leaks from edges of the display can be prevented to improve the visual experience.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
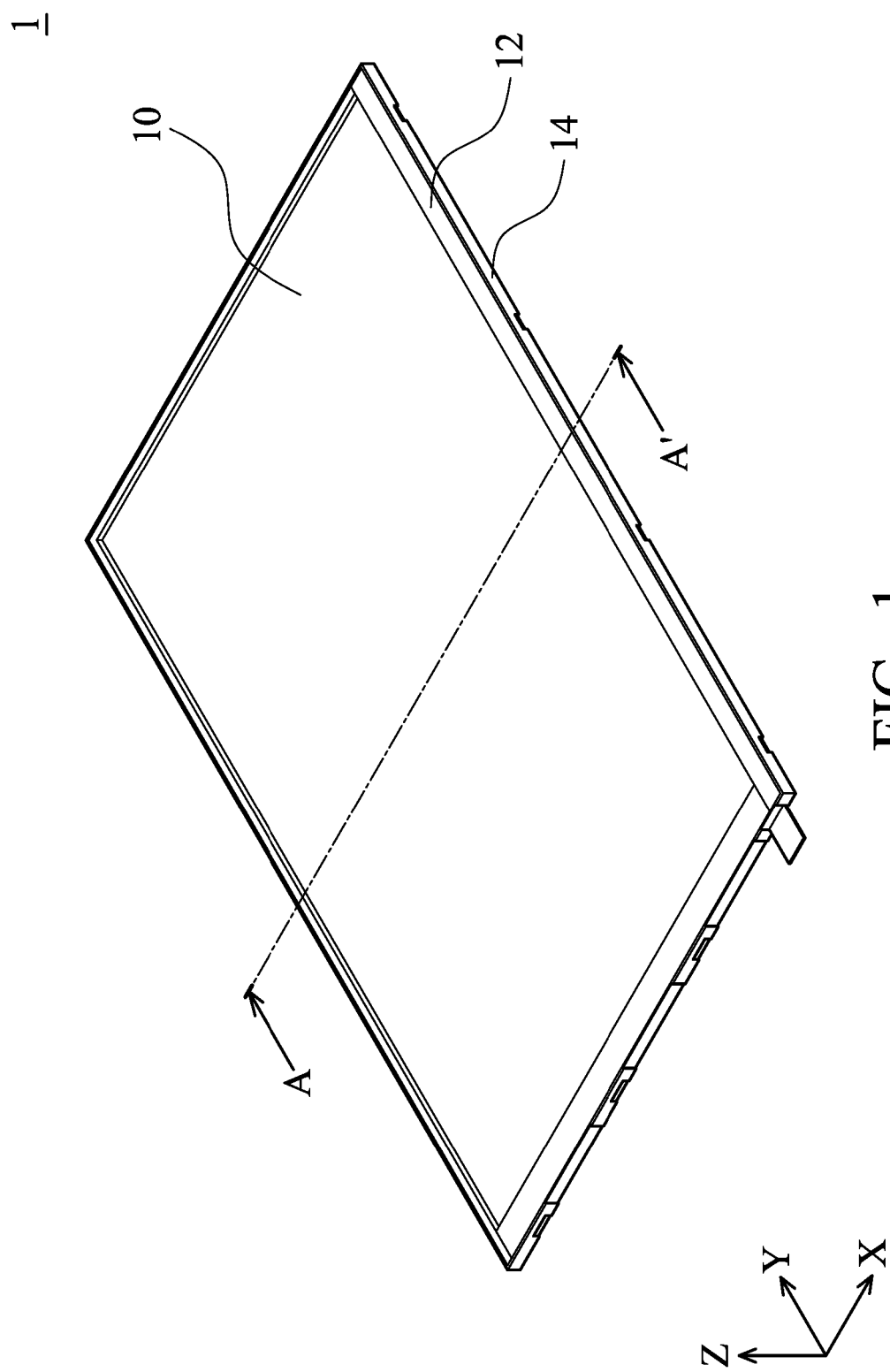
FIG. 1 is a three-dimensional diagram showing a backlight module of a liquid crystal display.

FIG. 1 is a three-dimensional diagram showing a backlight module of a liquid crystal display. As shown in FIG. 1, basically three portions can be seen from the appearance of the backlight module 1: a planar illuminant portion 10, a frame portion 12, and a housing portion 14. The planar illuminant portion 10 emits planar light toward the +Z direction. The frame portion 12 surrounds the planar illuminant portion 10 to restrict the X-directional position and the Y-directional position of the planar illuminant portion 10. The housing portion 14 contains the planar illuminant portion 10 and the frame portion 12, and functions with the frame portion 12 to restrict the Z-directional position of the planar illuminant portion 10.

Figure 2:
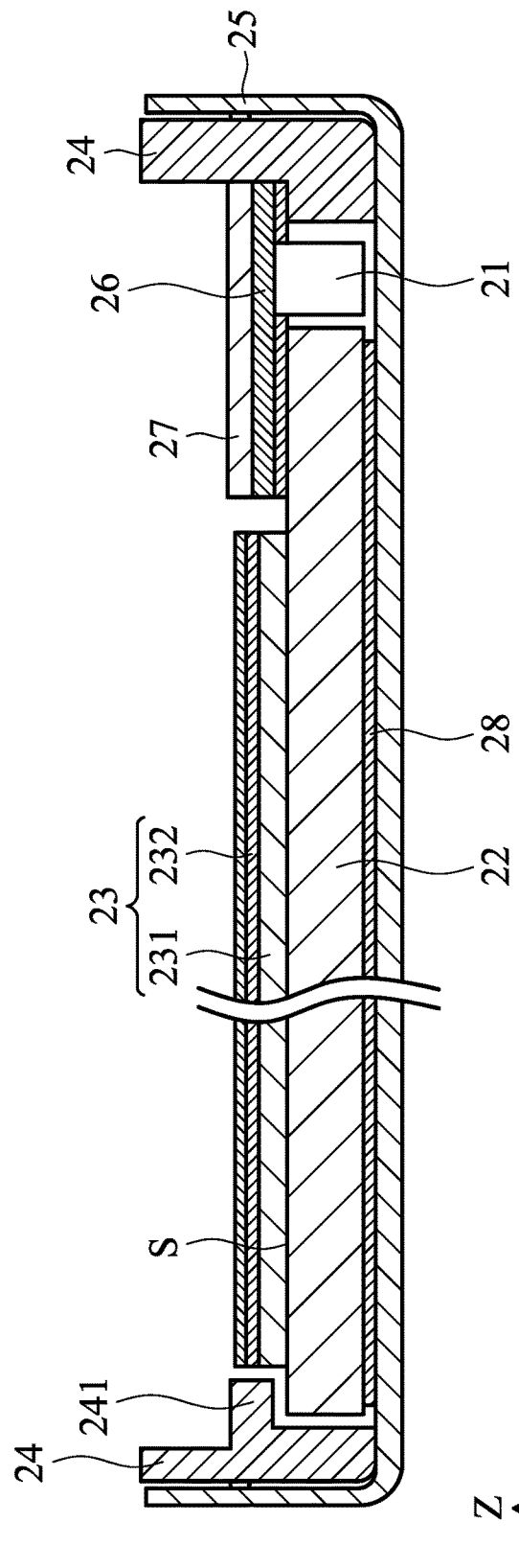
FIG. 2 is a section view of a conventional backlight module.

FIG. 2 is a section view of a conventional backlight module. When a convention backlight module is viewed from the A-A' section of FIG. 1, as shown in FIG. 2, the backlight module 2 comprises an LED light source 21, a light guiding plate 22, an optical film assembly 23, a ring-shaped frame 24, a bezel 25, a printed circuit board 26, a fixation pad 27, and a reflection film 28. The LED light source 21, the light guiding plate 22, and the optical film assembly 23 correspond to the planar illuminant portion 10 shown in FIG. 1; the ring-shaped frame 24 and the fixation pad 27 correspond to the frame portion 12 shown in FIG. 1; and the bezel 25 correspond to the housing portion 14 shown in FIG. 1.

The LED light source 21 comprises a plurality of blue light LED arranged along the Y direction, and emits blue light toward the −X direction. The light guiding plate 22 is a rectangular plane structure which guides the blue light emitted from the LED light source 21 and reflects the light repeatedly therein. The diffused light is then converted into uniform planar light and emitted from a first surface S along the +Z direction. The optical film assembly 23 is adhered on the first surface S of the light guiding plate 22. The optical film assembly 23 comprises a bottom optical film 231, and two upper optical films 232 layered above the bottom optical film 231. The bottom optical film 231 is a quantum dot enhancement film for converting blue light into multiple-color-mixed-light which is close to white light. The two upper optical films 232 can be diffusion film, micro-lens brightness enhancement film, etc.

The ring-shaped frame 24 has two sides extending along the Y direction to restrict the X-directional position of the LED light source 21 and the light guiding plate 22, and the other sides extending along the X direction to restrict the Y-directional position of the LED light source 21 and the light guiding plate 22. The ring-shaped frame 24 further has an extension portion 241 extending toward the +X direction. The bezel 2 has a "C" shaped cross section in the XZ plane to wrap the LED light source 21, the light guiding plate 22, and the ring-shaped frame 24 therein. The bottom surface of the bezel 25 further functions with the extension portion 241 to restrict the Z-directional position of the light guiding plate 22.

The printed circuit board 26 comprises a circuit for driving the LED light source 21, and is adhered across the ring-shaped frame 24 and the light guiding plate 22. The fixation pad 27 overlaps on the printed circuit board 26 to restrict the Z-directional position of the light guiding plate 22. The extension portion 241 of the ring-shaped frame 24 and the +Z directional surface of the fixation pad 27 are further used as a platform to support and adhere the display panel (not shown) thereon. The reflection film 28 is adhered between the −Z-directional surface of the light guiding plate 22 and the +Z-directional surface of the bezel 25 for reflecting light to the +Z direction.

When the structure shown in FIG. 2 is assembled, the ring-shaped frame 24 and the fixation pad 27 are used to fix the light guiding plate and then the optical film assembly 23 is placed on the +Z directional surface of the light guiding plate 22. A gap must be preserved between the optical film assembly 23 and the extension portion 241 of the ring-shaped frame 24, and between the optical film assembly 23 and the fixation pad 27 to prevent compressive deformation due to thermal expansion. However, the gap causes blue light leaks. From FIG. 2, it can be seen that the regions of the light guiding plate 22 at the gap positions are not covered by any one of the extension portion 241, the optical film assembly 23 and fixation pad 27. Therefore, blue light not passing through the quantum dot enhancement film 331 will be seen by the human eye such that visual experience becomes worse.

Figure 3:
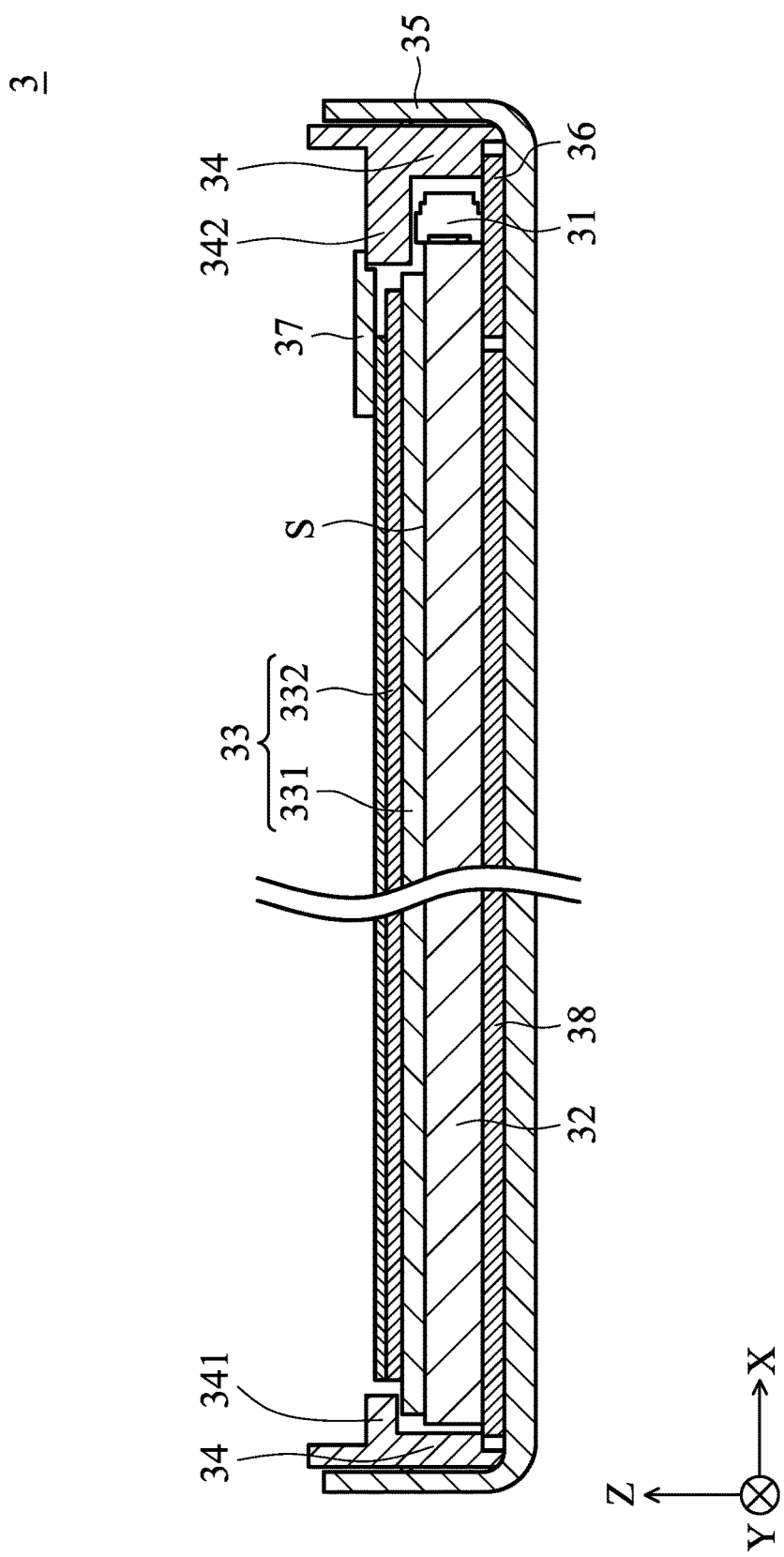
FIG. 3 is a section view of a backlight module in accordance with Embodiment 1 of the invention.

FIG. 3 is a section view of a backlight module in accordance with Embodiment 1 of the invention. When a backlight module in accordance with Embodiment 1 is viewed from the A-A' section of FIG. 1, as shown in FIG. 3, the backlight module 3 comprises a LED light source 31, a light guiding plate 32, an optical film assembly 33, a ring-shaped frame 34, a bezel 35, a printed circuit board 36, a shielding pad 37, and a reflection film 38.

The LED light source 31, the light guiding plate 32, the bezel 35, and the reflection film 38 shown in FIG. 3 are the same as the LED light source 21, the light guiding plate 22, the bezel 25, and the reflection film 28 respectively. Detailed descriptions for those elements are omitted.

In the structure shown in FIG. 3, the ring-shaped frame 34 has an extension portion 341 extending toward the +X direction and an extension portion 342 extending toward the −X direction. Although not shown in FIG. 3, the ring-shaped frame 34 also has an extension portion extending toward the +X direction and an extension portion extending toward the −X direction. The feature of Embodiment 1 of the invention is that the quantum dot enhancement film 331 which is the bottom optical film of the optical film assembly 33 extends toward the −X, +Y, and −Y directions more than the upper optical films 332, such that the extension portion 341 can cover at least three edges of the quantum dot enhancement film 331. At the side where the LED light source 31 is arranged, the extension portion 32 has to cover at least the LED light source 31. Therefore, if the extension portion 32 further extends toward the −X direction, the extension portion 32 is difficult to form and the strength thereof could be reduced. In this regard, the extension portion 342 extends only to the edge of the light guiding plate 32. Thus, the shielding pad 37 is added for further extending from the extension portion 342 toward the −X direction, which stretches across the gap between the optical film assembly 33 and the extension portion 342 and reaches the top of the optical film assembly 33. On the other hand, in cases where the thickness of the backlight module is not increased, the printed circuit board 36 formed below the LED light source 31 can not only increase the possible thickness of the extension portion 342 to increase its strength but also shorten the distance between the quantum dot enhancement film 331 and the LED light source 31.

In this embodiment, the quantum dot enhancement film 331 extends to the bottom of the extension portion 341. Therefore, the region of the light guiding plate 32 at the gap between the extension portion 341 and the optical film assembly 33 is at least covered by the quantum dot enhancement film 331. The blue light emitted from the light guiding plate 32 must pass through at least the quantum dot enhancement film 331 and then be converted to multiple-color-mixed-light which is close to white light. When the display is watched, white light leaks are more acceptable than blue light leaks. At the side where the LED light source 31 is arranged, the shielding pad 37 covers the gap so the blue light doesn't leak from this edge.

Figure 4:
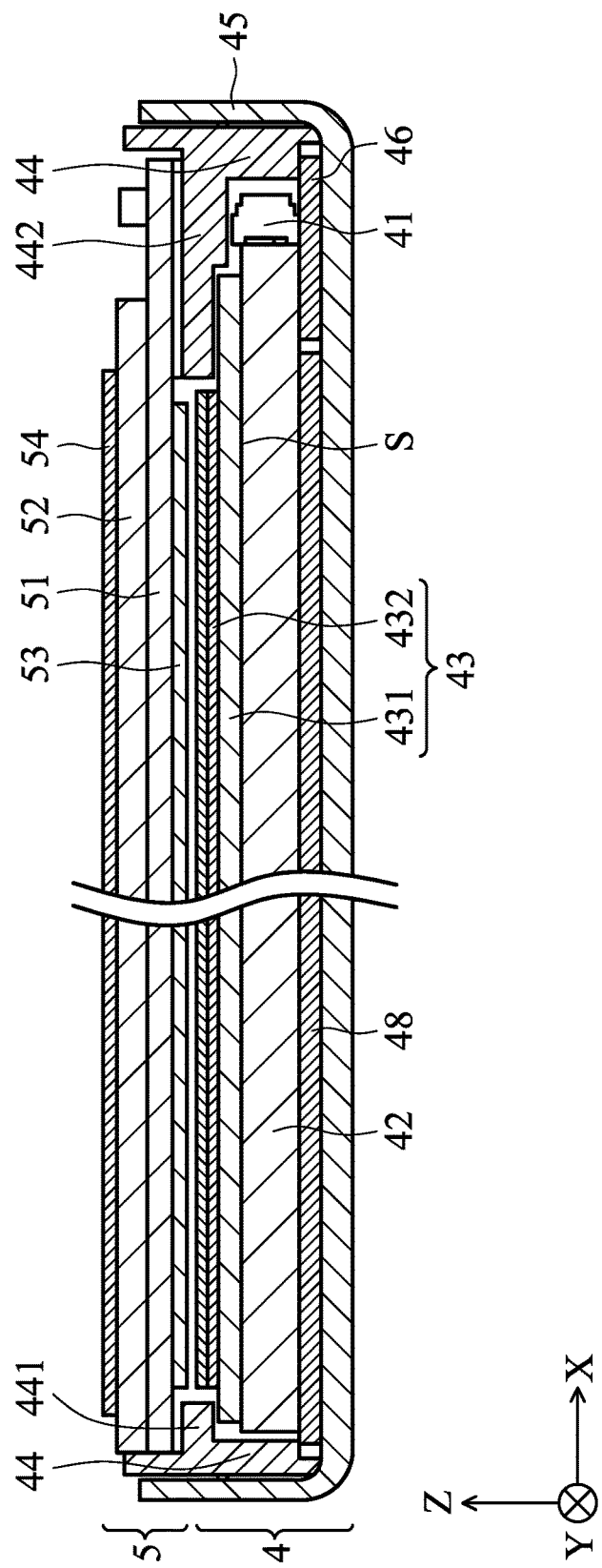
FIG. 4 is a section view of a backlight module and a display panel in accordance with Embodiment 2 of the invention.

FIG. 4 is a section view of a backlight module and a display panel in accordance with Embodiment 2 of the invention. When a backlight module in accordance with Embodiment 2 is viewed from the A-A' section of FIG. 1, as shown in FIG. 4, the backlight module 4 comprises an LED light source 41, a light guiding plate 42, an optical film assembly 43, a ring-shaped frame 44, a bezel 45, a printed circuit board 46, and a reflection film 48. In comparison with FIGS. 2 and 3, FIG. 4 depicts a display panel 5 for showing the structure when the backlight module 4 and the display panel 5 are assembled. The display panel 5 comprises a lower substrate 51, an upper substrate 52, a lower polarizer 53, and an upper polarizer 54. The display panel 5 is placed on the +Z directional surfaces of the extension portions 441 and 442 of the ring-shaped frame 44.

The LED light source 41, the light guiding plate 42, the extension portion 441 of the ring-shaped frame 44, the bezel 45, the printed circuit board 46, and the reflection film 48 in Embodiment 2 are the same as the LED light source 31, the light guiding plate 32, the extension portion 341 of the ring-shaped frame 34, the bezel 35, the printed circuit board 36, and the reflection film 38 in Embodiment 1 respectively. Detailed descriptions for those elements are omitted.

The difference between Embodiments 1 and 2 is that bottom optical film which is the quantum dot enhancement film 431 not only extends toward the −X, +Y and −Y directions but also toward the +X direction more the upper optical films 432. The extension portion 442 of the ring-shaped frame 44 which extends toward the −X direction not only covers the LED light source 41 but also extends to the top of the quantum dot enhancement film 431. Thereby, even at the side where the LED light source 41 is arranged, the region of the light guiding plate 42 at the gap between the extension portion 442 and the optical film assembly 43 is covered by at least the quantum dot enhancement film 431. In this way the blue light emitted from the light guiding plate 42 must pass through at least the quantum dot enhancement film 431 and then be converted to multiple-color-mixed-light which is close to white light.

Furthermore, the ring-shaped frame 34 in Embodiment 1 and ring-shaped frame 44 in Embodiment 2 can adopt a material with a white surface. With the white material having high reflectivity, the ring-shaped frame 34 or 44 reflects light incident to its surface to the quantum dot enhancement film 331 or 431, which reduces the intensity of blue light to increase vision experience.

According to Embodiment 1 and Embodiment 2, by extending only the quantum dot enhancement film which is at the lowest layer of the optical film assembly to the bottom of the extension portion of the ring-shaped frame, the invention prevents blue light leak from the edges of the display and improves vision experience. The entire optical film assembly is not required to extend to the bottom of the extension portion, so the extension portion of the ring-shaped frame doesn't have to be made extremely thin. The yield rate in the manufacturing process can be improved.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
   a light guiding plate having a first side surface and a second side surface;
   a plurality of light sources arranged along the second side surface of the light guiding plate;
   an optical film disposed above the light guiding plate;
   a quantum dot enhancement film disposed between the light guiding plate and the optical film, wherein the quantum dot enhancement film comprises a first edge and a second edge, the first edge is adjacent to the first side surface of the light guiding plate, and the second edge is adjacent to the second side surface of the light guiding plate; and
   a frame disposed outside the light guiding plate, the frame having a first extension portion and a second extension portion, wherein the first extension portion covers the first edge of the quantum dot enhancement film, and the second extension portion covers the second edge of the quantum dot enhancement film,
   wherein a distance between an end of the first extending portion and the first edge of the quantum dot enhancement film is a first distance, a distance between an end of the second extension portion and the second edge of the quantum dot enhancement film is a second distance, and the second distance is greater than the first distance.

2. The backlight module as claimed in claim 1, wherein the frame has a white surface faced to the quantum dot enhancement film or the light guiding plate.

3. The backlight module as claimed in claim 1, wherein at least one of the plurality of light sources is a blue LED.

4. The backlight module as claimed in claim 1, wherein the optical film is a diffusion film or a brightness enhancement film.

5. The backlight module as claimed in claim 1, further comprising:
   a printed circuit board disposed adjacent to the light guiding plate, the light guiding plate disposed between the printed circuit board and the quantum dot enhancement film.

6. The backlight module as claimed in claim 1, further comprising:
   a reflection film having a third edge and a fourth edge, wherein the third edge is adjacent to the first side surface of the light guiding plate, and the fourth edge is adjacent to the second side surface of the light guiding plate,
   wherein the light guiding plate is disposed between the quantum dot enhancement film and the reflection film, the first edge of the quantum dot enhancement film and the second edge of the quantum dot enhancement film are opposite to each other, the third edge of the reflection film and the fourth edge of the reflection film are opposite to each other, a distance between the first edge and the second edge is a third distance, a distance between the third edge and the fourth edge is a fourth distance, and the third distance is greater than the fourth distance.

7. A display device, comprising:
   a display panel; and
   a backlight module disposed adjacent to the display panel, the backlight module comprising:
      a light guiding plate having a first side surface and a second side surface;
      a plurality of light sources arranged along the second side surface of the light guiding plate;
      an optical film disposed above the light guiding plate;
      a quantum dot enhancement film disposed between the light guiding plate and the optical film, wherein the quantum dot enhancement film comprises a first edge and a second edge, the first edge is adjacent to the first side surface of the light guiding plate, and the second edge is adjacent to the second side surface of the light guiding plate; and
      a frame disposed outside the light guiding plate, the frame having a first extension portion and a second extension portion, wherein the first extension portion covers the first edge of the quantum dot enhancement film, and the second extension portion covers the second edge of the quantum dot enhancement film,
      wherein a distance between an end of the first extending portion and the first edge of the quantum dot enhancement film is a first distance, a distance between the end of the second extension portion and the second edge of the quantum dot enhancement film is a second distance, and the second distance is greater than the first distance.

8. The display device as claimed in claim 7, wherein the frame has a white surface faced to the quantum dot enhancement film or the light guiding plate.

9. The display device as claimed in claim 7, wherein at least one of the plurality of light sources is a blue LED.

10. The display device as claimed in claim 7, wherein the optical film is a diffusion film or a brightness enhancement film.

11. The display device as claimed in claim 7, wherein the backlight module further comprises:
    a printed circuit board located adjacent to the light guiding plate, the light guiding plate disposed between the printed circuit board and the quantum dot enhancement film.

12. The display device as claimed in claim 7, further comprising:
    a reflection film having a third edge and a fourth edge, wherein the third edge is adjacent to the first side surface of the light guiding plate, and the fourth edge is adjacent to the second side surface of the light guiding plate,
    wherein the light guiding plate is disposed between the quantum dot enhancement film and the reflection film, the first edge of the quantum dot enhancement film and the second edge of the quantum dot enhancement film are opposite to each other, the third edge of the reflection film and the fourth edge of the reflection film are opposite to each other, a distance between the first edge and the second edge is a third distance, a distance between the third edge and the fourth edge is a fourth distance, and the third distance is greater than the fourth distance.

13. The display device as claimed in claim 7, wherein the display panel further comprises:
    a first substrate and a first polarizer, wherein the first substrate is disposed between the first polarizer and the quantum dot enhancement film of the backlight module, a thickness of the first polarizer is a first thickness, a thickness of the quantum dot enhancement film is a second thickness, and the second thickness is greater than the first thickness.

14. The display device as claimed in claim 13, wherein the display panel further comprises:
    a second substrate and a second polarizer, wherein the second substrate is disposed between the first substrate and the quantum dot enhancement film of the backlight module, the second polarizer is disposed between the second substrate and the quantum dot enhancement film of the backlight module, a thickness of the second polarizer is a third thickness, and the second thickness is greater than the third thickness.

15. The display device as claimed in claim 13, wherein the first polarizer has a fifth edge and a sixth edge, the fifth edge is adjacent to the first side surface of the light guiding plate, and the sixth edge is adjacent to the second side surface of the light guiding plate, the first polarizer covers the end of the first extension portion, the first polarizer covers the end of the second extension portion, a distance between the end of the first extending portion and the fifth edge of the first polarizer is a fourth distance, a distance between the end of the second extension portion and the sixth edge of the first polarizer is a fifth distance, and the fifth distance is greater than the fourth distance.

* * * * *